April 14, 1942.  Z. T. LINDSEY  2,279,690
COMBINATION MOTOR GENERATOR
Filed Nov. 7, 1939   3 Sheets-Sheet 1

Z. T. Lindsey,
INVENTOR

BY Victor J. Evans & Co.
ATTORNEYS

April 14, 1942.                Z. T. LINDSEY                2,279,690
                         COMBINATION MOTOR GENERATOR
                            Filed Nov. 7, 1939           3 Sheets-Sheet 2

Z. T. Lindsey,
INVENTOR

By Victor J. Evans & Co.
ATTORNEYS

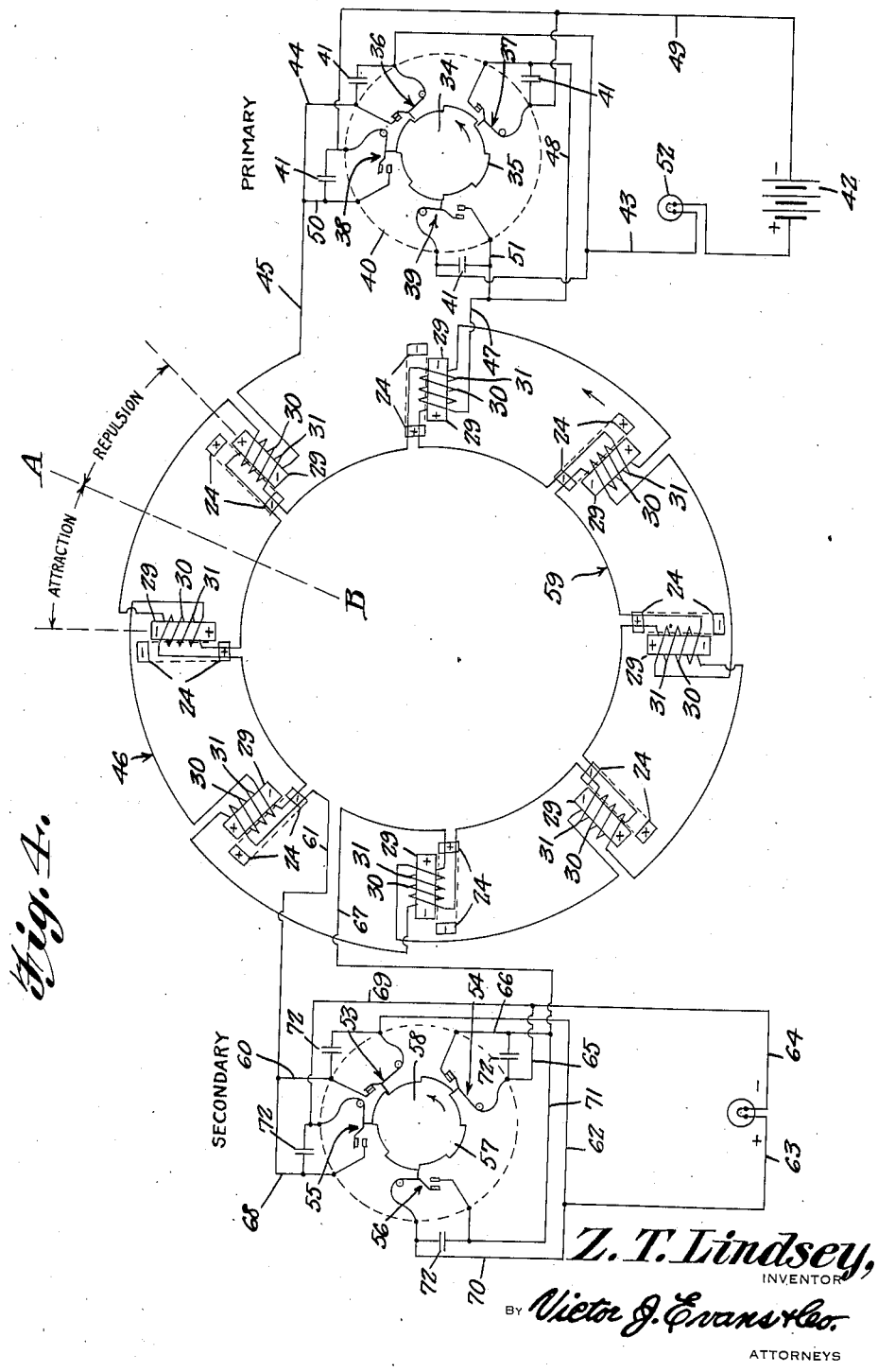

Patented Apr. 14, 1942

2,279,690

UNITED STATES PATENT OFFICE 2,279,690

COMBINATION MOTOR GENERATOR

Z. T. Lindsey, San Saba, Tex.

Application November 7, 1939, Serial No. 303,291

1 Claim. (Cl. 171—252)

This invention relates to a combination motor generator and has for an object to provide a simplified device of this character embodying magnets on the rotor and battery energized coils on the stator, breaker points being associated with the coils in such a manner as to change the polarity of the coils so that for a predetermined travel of the magnets the coils will repel the magnets and for a like distance the coils will attract the magnets to rotate the rotor.

A further object is to provide a device of this character in which current is induced in certain of the coils, or secondary windings of the coils where plural windings are used, as the coils or windings pass the magnets, this being necessarily alternating current, breaker points being associated with the coils for changing the induced alternating current to direct current to be used for any useful purpose.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming a part of this specification:

Figure 3 is a longitudinal sectional view of one set of the breaker points.

Figure 4 is a diagrammatic view of the electrical connections of one form of the device in which each coil has two windings to provide an electromagnet as well as an induction coil.

Figure 1:
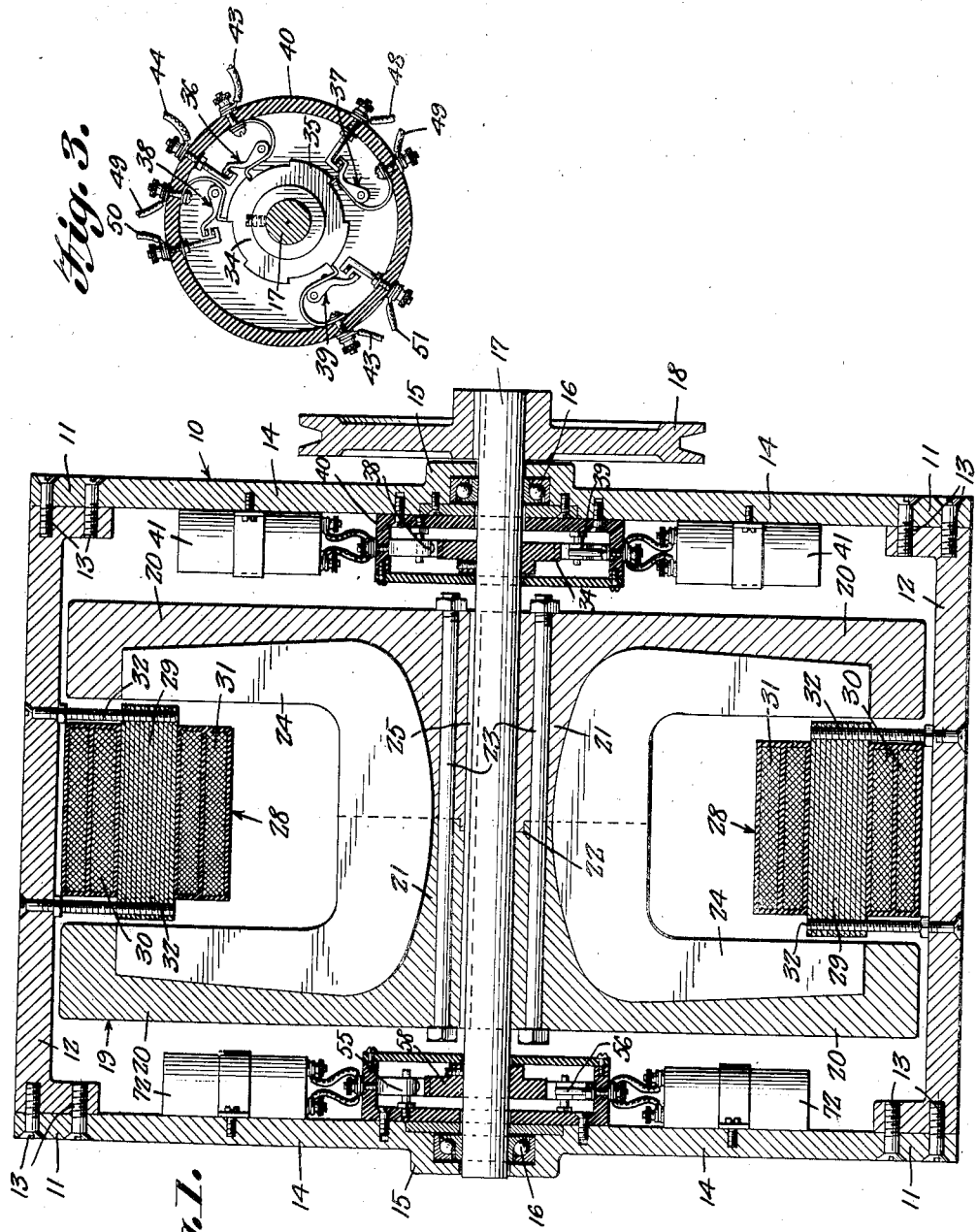
Figure 1 is a cross sectional view of a combination motor generator constructed in accordance with the invention.
Figure 2:
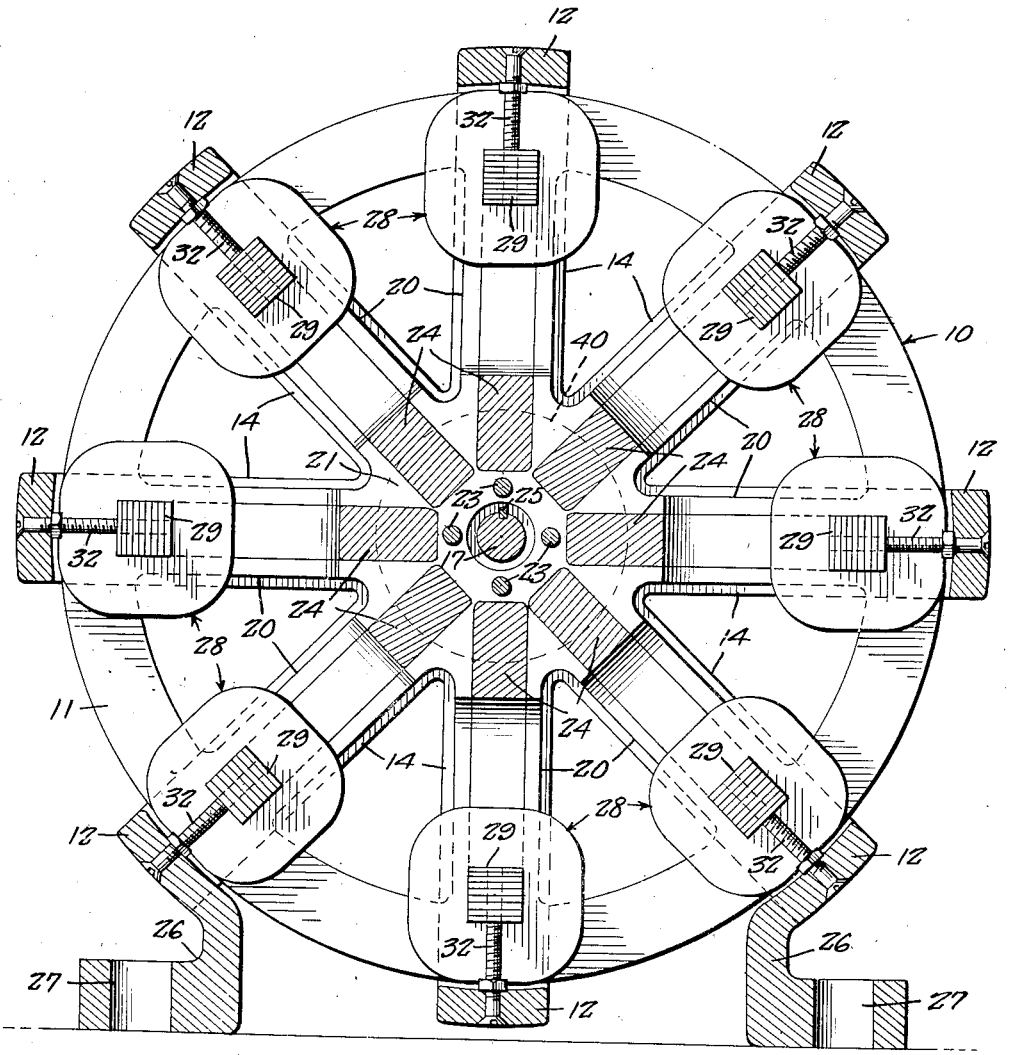
Figure 2 is a longitudinal sectional view of the motor generator with parts in elevation.

Referring now to the drawings in which like characters of reference designate similar parts in the various views, the stator 10 comprises spaced parallel frame rings 11 connected at intervals by cross bars 12 which are secured to the rings by screws 13 or other connectors. The rings are provided with radially disposed spokes 14 which are integral with hubs 15 which are shaped to receive ball bearings 16 and the ends of a shaft 17. One end of the shaft is equipped with a power take-off pulley 18.

The rotor 19 comprises spaced parallel spokes 20 having respective hubs 21 which interfit as shown at 22, and which are secured together by bolts 23. The spokes are hollowed out on their inner faces to receive respective legs of horseshoe permanent magnets 24, although electromagnets may be employed if desired. The rotor is fixed to the shaft 17 by a key 25.

The stator is equipped with brackets 26 which are formed integral with a pair of the lower cross bars 12. The brackets are provided with openings 27 which receive bolts, or other connectors, for rigidly securing the stator to a support.

Mounted on the cross bars 12 are a plurality of combined electromagnets and induction coils 28 each having a laminated soft iron core 29, the ends of which confront the inner faces of the legs, at the ends of the legs, for permanent magnets 24 as the latter move in a circular path concentric with the shaft 17. A primary winding 30 is disposed on the core and a secondary winding 31 is disposed on the primary winding. Each electromagnet and induction coil thus formed is connected to a respective cross bar 12 by bolts 32 to anchor the same stationary to the stator.

There are eight coils 28 shown in the present embodiment, although a greater number may be used if desired and there are a like number of permanent magnets. The polarity of the coils must be reversed as the permanent magnets pass the coils, and for this purpose a combined make-and-break and pole reversing device is shown on the right of Figure 4 and is shown in detail in Figure 3. The device includes a cam disc 34 having four arcuate cam projections 35, the disc being adjustably mounted on one end of the shaft.

There are four sets of make-and-break points, 36, 37, 38 and 39, similar to the make-and-break points of ignition systems for motor vehicles, carried by a casing 40, and operated by the cam projections, and the points of each set are bridged by a respective condenser 41. Two sets of points, namely, 36 and 37, are moved to closed position simultaneously with movement of the other two sets of points, 38 and 39, to open position, and vice versa.

The points of the set 36 are connected on one side to the positive side of a battery 42 by a conductor 43 and are connected on the other side by a conductor 44 and a conductor 45 to one end of the coil circuit 46. The other end of the coil circuit is connected by conductors 47 and 48 to one side of the set 37. The other side of the set 37 is connected to the negative side of the battery by a conductor 49. The points of the set 38 are connected on one side to the conductor 49 which leads to the negative side of the battery. The other side of the set 38 is connected by a conductor 50 to the conductor 45 which is connected to the primary coil circuit 46. The other end of the coil circuit 46 is connected by the conductor 47 and a conductor 51 to one side of the set 39. The other side of the set 39 is connected to the conductor 43 which returns to the positive side of the battery. A pilot lamp 52 is positioned in the battery line 43.

As shown in Figure 4 the primary winding of each coil 28 is reversed in direction from the primary winding of the next adjacent coil. Thus when the two sets of points 36 and 37 are closed by the cam disc 34 to connect the coil circuit 46 to the positive and to the negative poles of the battery, the current will flow in one direction through the coil circuit to cause the north and south poles of the coils to be located at those ends of the coils designated + and —. However, when the two sets of points 38 and 39 are closed to reverse the connection of the coil circuit 46 to the negative and positive poles of the battery, current will flow in the opposite direction through the coil circuit and reverse the direction of the poles of the magnets from that illustrated.

This reversal of current flow in the coil circuit 46 occurs approximately as the permanent magnets 24 pass the coils 28 and as a result, as may be seen diagrammatically by broken lines and legends in Figure 4, like poles of the coils and of the permanent magnets will confront each other to repel the permanent magnets through an arcuate advance from one coil to the line A—B and designated by the legend "repulsion." Opposite poles of the coils and permanent magnets will confront each other as the permanent magnets progress from the line A—B through the arcuate advance designated by the legend "attraction." Rotation of the rotor in counter-clockwise direction is thus effected.

At each "break" of the sets of points there will be a current generated in the secondary windings 31 of all of the coils. This current will, of course, be alternating current and in order to rectify or change it to direct current a device employing a cam disc and sets of points similar to the above described pole reversing device, is employed, and is shown at the left of Figure 4.

In the rectifying device there are four sets of points 53, 54, 55 and 56 as previously described. Two sets of points, namely, 53 and 54 are moved to closed position by projections 57 on a cam disc 58 attached to the opposite end of the shaft from the cam disc 34, simultaneously with movement of the other two sets of points, 55 and 56, to open position, and vice versa.

The points of the set 53 are connected on one side to the generator circuit 59 by conductors 60 and 61 and are connected on the other side by a conductor 62 to the positive wire 63 of a current supply circuit. The negative wire 64 of the current supply circuit is connected by a conductor 65 to one side of the set 54. The other side of the set 54 is connected by conductors 66 and 67 to the other side of the generator circuit. One side of the set 55 is connected by a conductor 68 through the conductor 61 to one side of the generator circuit 59. The other side of the set 55 is connected to the negative wire 64 of the supply circuit by a conductor 69. The positive wire 63 of the supply circuit is connected to one side of the set 56 by a conductor 70. The other side of the set 56 is connected to the conductor 67 of the generator circuit 59 by a conductor 71. The points of each set are bridged by a respective condenser 72.

It can now be seen that when current is flowing through the coils to produce the plus and minus poles of the coils as indicated in Figure 4, the points of the sets 53 and 54 will be closed to connect the generator circuit wires 61 and 67 to the positive and negative circuit wires 63 and 64. However, when the direction of current flow in the coils is reversed from that just explained, the closed points of the sets 55 and 56 connect the generator circuit wires 61 and 67 to the positive and negative current wires 63 and 64. Thus full wave rectification of the alternating current produced in the secondary windings of the coils is accomplished.

In addition to the generated current produced as above described, it will be observed that as the poles of the permanent magnets in the rotor pass the coils on the stator the lines force of the magnets will be cut by the coils and a current induced in the coils. This induced current will augment the current caused by the break in the primary winding of each coil and tends to increase the efficiency of the device.

What is claimed is:

A combination motor generator, comprising a stator including spaced parallel frame rings connected at intervals by cross bars, radially disposed spokes connected to the rings, a hub for the spokes of the respective rings, a shaft freely rotatable in the hubs, a rotor including spaced parallel spokes having respective hubs secured together and fixed to the shaft, opposing faces of the rotor spokes being hollowed out, permanent horseshoe magnets receivable in the hollowed out portions of the spokes with their open ends outwardly, and a plurality of combined electromagnets and induction coils mounted on the cross bars, each having a core, the ends of which confront the inner faces of the ends of the legs of the horseshoe magnets as they move in a circular path concentric with said shaft, a primary winding disposed on the core, a secondary winding disposed on the primary winding, means carried by the ends of the shaft for making and breaking the circuits to the primary winding, and means carried by the shaft for making and breaking the circuits to the secondary winding.

Z. T. LINDSEY.